(12) United States Patent
Konuma et al.

(10) Patent No.: US 11,719,206 B2
(45) Date of Patent: Aug. 8, 2023

(54) HIGH-PRESSURE FUEL PIPE

(71) Applicant: HONDA MOTOR CO., LTD., Tokyo (JP)

(72) Inventors: Takayuki Konuma, Tokyo (JP); Aoi Tabuchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/795,756

(22) PCT Filed: Feb. 28, 2020

(86) PCT No.: PCT/JP2020/008536
§ 371 (c)(1),
(2) Date: Jul. 27, 2022

(87) PCT Pub. No.: WO2021/171621
PCT Pub. Date: Sep. 2, 2021

(65) Prior Publication Data
US 2023/0095779 A1    Mar. 30, 2023

(51) Int. Cl.
*F02M 55/02*    (2006.01)
*F02M 59/16*    (2006.01)
(Continued)

(52) U.S. Cl.
CPC ........ *F02M 55/025* (2013.01); *F02M 59/025* (2013.01); *F02M 59/16* (2013.01); *F16L 55/027* (2013.01)

(58) Field of Classification Search
CPC .... F02M 55/025; F02M 59/025; F02M 59/16; F16L 55/027
(Continued)

(56) References Cited

U.S. PATENT DOCUMENTS 5,752,486 A    5/1998  Nakashima et al.
6,401,691 B1   6/2002  Kawano et al.
(Continued)

FOREIGN PATENT DOCUMENTS

CN    103967635 B  *  1/2018  ......... F02D 41/0025
DE    112016003764 T5 *  5/2018  ......... F02D 19/0647
(Continued)

OTHER PUBLICATIONS

International Search Report issued in PCT/JP2020/008536 dated May 26, 2020.

*Primary Examiner* — Mahmoud Gimie
(74) *Attorney, Agent, or Firm* — Birch, Stewart, Kolasch & Birch, LLP

(57) ABSTRACT

A high-pressure fuel pipe is a pipe disposed between an injector and a high-pressure fuel pump, the high-pressure fuel pump is provided on a downstream side of a low-pressure fuel pump, an engine is a single cylinder or a two-cylinder, the high-pressure fuel pump is a plunger type that performs pressurization once or twice per rotation in synchronization with a camshaft of the engine, and a volume of the high-pressure fuel pipe is $k \times Q/\Delta P/1000 \times n$ or less, where $k$ is a volume modulus of fuel, $Q$ is a maximum discharge amount of the fuel in one reciprocation of the high-pressure fuel pump, $\Delta P$ is a difference between a target fuel pressure boosted by the high-pressure fuel pump and a feed fuel pressure boosted by the low-pressure fuel pump, and $n$ is the number of times of boosting in one rotation of the high-pressure fuel pump.

7 Claims, 10 Drawing Sheets

(51) Int. Cl.
*F02M 59/02* (2006.01)
*F16L 55/027* (2006.01)

(58) Field of Classification Search
USPC .......................................... 123/446
See application file for complete search history.

(56) References Cited

U.S. PATENT DOCUMENTS

| | | |
|---|---|---|
| 2003/0116134 A1 | 6/2003 | Kojima |
| 2004/0089732 A1 | 5/2004 | Nonoyama |

FOREIGN PATENT DOCUMENTS

| | | | |
|---|---|---|---|
| EP | 1 939 423 A2 | 7/2008 | |
| JP | 9-170514 A | 6/1997 | |
| JP | 2000-192872 A | 7/2000 | |
| JP | 2003-184610 A | 7/2003 | |
| JP | 2004-84560 A | 3/2004 | |
| JP | 2004-92447 A | 3/2004 | |
| JP | 2004-150316 A | 5/2004 | |
| JP | 2004-285963 A | 10/2004 | |
| JP | 2005248757 A * | 9/2005 | ......... F02D 41/3094 |
| JP | 2006138264 A * | 6/2006 | |
| JP | 2008-163757 A | 7/2008 | |
| JP | 2012-127359 A | 7/2012 | |
| JP | 2016-205190 A | 12/2016 | |

\* cited by examiner

Fig.6

$$VtMax \leq k \times Q/\Delta P/1000 \times n$$

VtMax : MAXIMUM VALUE [cm³] OF VOLUME
k : VOLUME MODULUS [MPa] OF FUEL
Q : PUMP MAXIMUM ACTUAL DISCHARGE AMOUNT [mm³/STROKE]
ΔP : DIFFERENCE [MPa] BETWEEN TARGET FUEL PRESSURE P1
AND FEED FUEL PRESSURE
n : NUMBER OF TIMES OF BOOSTING IN ONE ROTATION OF
HIGH-PRESSURE FUEL PUMP

Fig. 7

$$VtMin \geqq q/0.6$$

VtMin : MINIMUM VALUE [cm³] OF VOLUME
q : AMOUNT [mm³/s] OF FUEL PRESSURE-FED BY HIGH-PRESSURE FUEL PUMP IN ONE SECOND

Fig.8

$$VtMin \geqq q/0.4$$

VtMin: MINIMUM VALUE [cm³] OF VOLUME
q: AMOUNT [mm³/s] OF FUEL PRESSURE-FED BY HIGH-PRESSURE FUEL PUMP IN ONE SECOND

Fig.9

$$q/0.4 \leq Vt \leq k \times Q/\Delta P/1000 \times n$$

Vt : VOLUME [cm³]
k : VOLUME MODULUS [MPa] OF FUEL
Q : PUMP MAXIMUM ACTUAL DISCHARGE AMOUNT [mm³/STROKE]
ΔP : DIFFERENCE [MPa] BETWEEN TARGET FUEL PRESSURE P1
    AND FEED FUEL PRESSURE
n : NUMBER OF TIMES OF BOOSTING IN ONE ROTATION OF
    HIGH-PRESSURE FUEL PUMP
q : AMOUNT [mm³/s] OF FUEL PRESSURE-FED
    BY HIGH-PRESSURE FUEL PUMP IN ONE SECOND

Fig.10

$$Vt1Min \geqq q/3.0$$

Vt1Min : MINIMUM VALUE OF PRE-ORIFICE VOLUME
q : AMOUNT OF FUEL PRESSURE-FED
BY HIGH-PRESSURE FUEL PUMP IN ONE SECOND

HIGH-PRESSURE FUEL PIPE

TECHNICAL FIELD

The present invention relates to a high-pressure fuel pipe, and more particularly to a high-pressure fuel pipe applied to a cylinder injection engine that directly injects fuel into a combustion chamber of the engine.

BACKGROUND ART

Conventionally, in a cylinder injection engine (direct injection engine) that directly injects fuel into a combustion chamber, there has been known a configuration in which a high-pressure fuel pump that pressure-feeds fuel and an injector that injects the fuel are connected by a high-pressure fuel pipe.

Patent Literature 1 discloses a configuration in which, in a parallel four-cylinder direct injection engine mounted on a saddle-type vehicle, a high-pressure fuel pump is disposed above a cylinder head and a high-pressure fuel pipe is disposed between the high-pressure fuel pump and an injector disposed near an intake port.

CITATION LIST

Patent Literature

SUMMARY OF INVENTION

Problem to be Solved by Invention

Here, when the high-pressure fuel pipe is applied to a single-cylinder or two-cylinder engine in which the number of times of fuel injection per cycle is smaller compared with a multi-cylinder engine including three or more cylinders, in particular, the volume of the high-pressure fuel pipe is an important parameter. Specifically, it is preferable that the volume be larger in order to suppress pressure fluctuation involved in fuel pressure-feed by the high-pressure fuel pump but it is preferable that the volume be smaller in order to quickly boost the pressure of fuel at the time of engine start. In other words, if the volume is too large, startability tends to be deteriorated by a pressure boost delay and, if the volume is too small, the pressure fluctuation tends to occur. Conventionally, it has been difficult to derive an appropriate volume of the high-pressure fuel pipe on a desk. However, the inventor of the present invention has made it possible to derive such an appropriate volume of the high-pressure fuel pipe with a predetermined arithmetic expression.

An object of the present invention is to solve the above-described problems of the prior art and to provide a high-pressure fuel pipe to which an appropriate volume is given by a predetermined arithmetic expression.

Solution to Problem

In order to achieve the above object, the present invention has a first feature in that a high-pressure fuel pipe (31) is applied to a cylinder injection type engine (E) that directly injects fuel into a combustion chamber (69) with an injector (32), wherein the high-pressure fuel pipe (31) is a pipe disposed between the injector (32) and a high-pressure fuel pump (30), the high-pressure fuel pump (30) is provided on a downstream side of a low-pressure fuel pump (33), the engine (E) is a single cylinder or a two-cylinder, the high-pressure fuel pump (30) is a plunger type that performs pressurization once or twice per rotation in synchronization with a camshaft (71) of the engine (E), and a value of a volume (Vt) of the high-pressure fuel pipe (31) is $k \times Q/\Delta P/1000 \times n$ or less, where k is a volume modulus of fuel, Q is a maximum discharge amount of the fuel in one reciprocation of the high-pressure fuel pump (30), $\Delta P$ is a difference between a target fuel pressure (P1) boosted by the high-pressure fuel pump (30) and a feed fuel pressure (P0) boosted by the low-pressure fuel pump (33), and n is a number of times of boosting in one rotation of the high-pressure fuel pump (30).

Further, the present invention has a second feature in that the value of the volume (Vt) of the high-pressure fuel pipe (31) is q/0.6 or more, where q is an amount of the fuel pressure-fed by the high-pressure fuel pump (30) in one second.

Further, the present invention has a third feature in that the value of the volume (Vt) of the high-pressure fuel pipe (31) is q/0.4 or more, where q is an amount of the fuel pressure-fed by the high-pressure fuel pump (30) in one second.

Further, the present invention has a fourth feature in that the volume (Vt) of the high-pressure fuel pipe (31) is calculated by a following arithmetic expression $q/0.4 \leq Vt \leq k \times Q/\Delta P/1000 \times n$.

Further, the present invention has a fifth feature in that the volume (Vt) of the high-pressure fuel pipe (31) includes a pre-orifice volume (Vt1) on an upstream side and a post-orifice volume (Vt2) on a downstream side across an orifice (31b), and a value of the pre-orifice volume (Vt1) is q/3.0 or more.

Further, the present invention has a sixth feature in that the engine (E) is a single cylinder engine, k as the volume modulus of the fuel is 1300 MPa, Q as the maximum discharge amount of the fuel in one reciprocation of the high-pressure fuel pump (30) is 26.12 mm³/stroke, and n as the number of times of boosting is one.

Further, the present invention has a seventh feature in that the engine (E) is a two-cylinder engine, k as the volume modulus of the fuel is 1300 MPa, Q as the maximum discharge amount of the fuel in one reciprocation of the high-pressure fuel pump (30) is 120.00 mm³/stroke, and n as the number of times of boosting is two.

Advantageous Effects of Invention

According to the first feature, the high-pressure fuel pipe (31) is applied to the cylinder injection type engine (E) that directly injects the fuel into the combustion chamber (69) with the injector (32), wherein the high-pressure fuel pipe (31) is the pipe disposed between the injector (32) and the high-pressure fuel pump (30), the high-pressure fuel pump (30) is provided on the downstream side of the low-pressure fuel pump (33), the engine (E) is the single-cylinder or the two-cylinder, the high-pressure fuel pump (30) is the plunger type that performs boosting once or twice per rotation in synchronization with the camshaft (71) of the engine (E), and the value of a volume (Vt) of the high-pressure fuel pipe (31) is $k \times Q/\Delta P/1000 \times n$ or less, where k is the volume modulus of fuel, Q is the maximum discharge amount of fuel in one reciprocation of the high-pressure fuel pump (30), $\Delta P$ is the difference between the target fuel pressure (P1) boosted by the high-pressure fuel pump (30) and the feed fuel pressure (P0) boosted by the low-pressure fuel pump (33), and n is the number of times of boosting in one rotation of the high-pressure fuel pump (30). Therefore, in setting a volume of the high-pressure fuel pipe, focusing on a fact that a pressure boosted during one rotation of the high-pressure fuel pump does not reach the target fuel pressure when the volume is too large, it is possible to calculate, with an arithmetic expression, a maximum value of a volume in a range in which a pressure boosted during one rotation of the high-pressure fuel pump reaches a target fuel pressure and it is possible to reduce design man-hour.

According to the second feature, the value of the volume (Vt) of the high-pressure fuel pipe (31) is q/0.6 or more, where q is the amount of the fuel pressure-fed by the high-pressure fuel pump (30) in one second. Therefore, when the volume of the high-pressure fuel pipe is set, focusing on the fact that the accuracy of an air-fuel ratio caused by the magnitude of pressure fluctuation (fuel pressure pulsation) of the high-pressure fuel pipe exceeds an allowable value if the volume is too small, it is possible to calculate, with an arithmetic expression, a minimum value of the volume in a range in which the accuracy of the air-fuel ratio does not exceed the allowable value.

According to the third feature, the volume (Vt) of the high-pressure fuel pipe (31) is q/0.4 or more, where q is the amount of the fuel pressure-fed by the high-pressure fuel pump (30) in one second. Therefore, when the volume of the high-pressure fuel pipe is set, focusing on the fact that the fuel pressure is too high and a relief valve of the high-pressure fuel pump operates if the volume is too small, it is possible to calculate, with an arithmetic operation, a minimum value of the volume in a range in which the relief valve of the high-pressure fuel pump does not operate.

According to the fourth feature, since the volume (Vt) of the high-pressure fuel pipe (31) is calculated by the following arithmetic expression $q/0.4 \leq Vt \leq k \times Q/\Delta P/1000 \times n$. Since a minimum value of the volume focusing on the operation of the relief valve is larger than a minimum value of the volume focusing on the accuracy of the air-fuel ratio, a maximum value and a minimum value of the volume of the high-pressure fuel pipe can be calculated by an arithmetic expression by applying the minimum value of the volume focusing on the operation of the relief valve.

According to the fifth feature, the volume (Vt) of the high-pressure fuel pipe (31) includes the pre-orifice volume (Vt1) on the upstream side and the post-orifice volume (Vt2) on the downstream side across the orifice (31b) and the value of the pre-orifice volume (Vt1) is q/3.0 or more. Therefore, when the pre-orifice volume is set after the volume of the high-pressure fuel pipe is set, focusing on the fact that the accuracy of the air-fuel ratio caused by the magnitude of pressure fluctuation (fuel pressure pulsation) of the high-pressure fuel pipe exceeds an allowable value if the pre-orifice volume is too small, it is possible to calculate, by an arithmetic expression, a minimum value of the pre-orifice volume in a range in which the accuracy of the air-fuel ratio does not exceed the allowable value.

According to the sixth feature, since the engine (E) is the single-cylinder engine, k as the volume modulus of the fuel is 1300 MPa, Q as the maximum discharge amount of the fuel in one reciprocation of the high-pressure fuel pump (30) is 26.12 mm³/stroke, and n as the number of times of boosting is one, it is possible to calculate, with an arithmetic operation, a maximum value and a minimum value of the volume of the high-pressure fuel pipe suitable for the cylinder injection type single-cylinder engine.

According to the seventh feature, since the engine (E) is the two-cylinder engine, k as the volume modulus of the fuel is 1300 MPa, Q as the maximum discharge amount of the fuel in one reciprocation of the high-pressure fuel pump (30) is 120.00 mm³/stroke, and n as the number of times of boosting is 2, it is possible to calculate, with an arithmetic expression, a maximum value and a minimum value of the volume of the high-pressure fuel pipe suitable for the cylinder injection type two-cylinder engine.

BRIEF DESCRIPTION OF DRAWINGS

FIG. 6 is an arithmetic expression for calculating a maximum value of the volume of the high-pressure fuel pipe.

FIG. 7 is an arithmetic expression for calculating a minimum value of the volume of the high-pressure fuel pipe.

FIG. 8 is a second arithmetic expression for calculating a minimum value of the volume of the high-pressure fuel pipe.

FIG. 9 is an arithmetic expression for calculating a range of an appropriate volume of the high-pressure fuel pipe.

FIG. 10 is an arithmetic expression for calculating a minimum value of a pre-orifice volume of the high-pressure fuel pipe.

DESCRIPTION OF EMBODIMENTS

Figure 1:
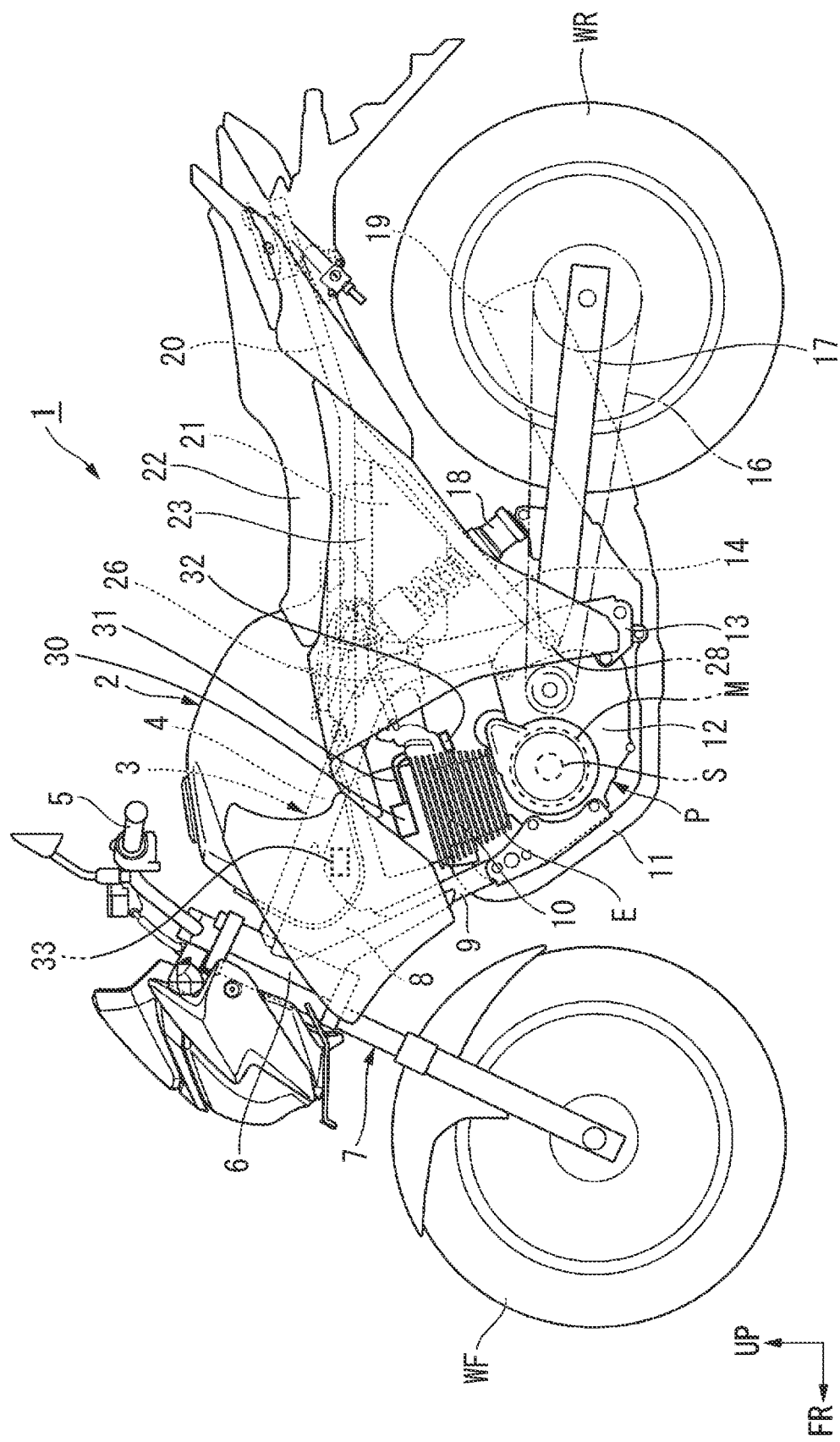
FIG. 1 is a left side view of a motorcycle to which a high-pressure fuel pipe according to an embodiment of the present invention is applied.

Hereinafter, a preferred embodiment of the present invention is explained in detail with reference to the drawings. FIG. 1 is a left side view of a motorcycle 1 to which a high-pressure fuel pipe 31 according to an embodiment of the present invention is applied. The motorcycle 1 is a sports-type saddle-type vehicle that transmits rotational power of an engine E, which is a power source of a power unit P, to a rear wheel WR via a stepped transmission housed in a crankcase 12. The engine E is a cylinder injection type engine (direct injection engine) that directly injects fuel into a combustion chamber with an injector 32 disposed at a rear portion of a cylinder head 10.

A head pipe 6 pivotally supporting a steering mechanism of a front wheel WF so as to be swingable is provided at the front end portion of a main frame 4 configuring a vehicle body frame 3. The front wheel WF is pivotally supported so as to be rotatable at the lower end portions of a pair of left and right front forks 7 configuring the steering mechanism. A steering handle 14 for steering the steering mechanism is attached to upper portions of the front forks 7.

A hanger frame 9 that supports the front side of the crankcase 12 of the power unit P is connected to a lower position of the head pipe 6. A plate-like reinforcing gusset 8 is bridged between the main frame 4 and the hanger frame 9. A pair of left and right pivot plates 13 provided with pivots 28 pivotally supporting the front end portion of a swing arm 17 so as to be swingable is fixed to the lower end portion of the main frame 4 extending rearward from the head pipe 6 and curved downward. The swing arm 17 pivotally supporting the rear wheel WR so as to be rotatable is suspended from the main frame 4 by a rear cushion 18. A driving force of the engine E is transmitted to the rear wheel WR via a drive chain 16.

The power unit P integrally configuring the four-cycle engine E and the stepped transmission is supported by the pivot plate 13 and the hanger frame 9. The injector 32 and a throttle body 26 are fixed to a rear portion of the cylinder head 10 of the engine E. An air cleaner box 21 is connected to a rear portion of the throttle body 26. A high-pressure fuel pump 30 that pressure-feeds fuel to the injector 32 through the high-pressure fuel pipe 31 is attached to a left side of the cylinder head 10 in a vehicle width direction.

On the other hand, an exhaust pipe 11 that guides a combustion gas to a muffler 19 behind a vehicle body is connected to a front portion of the cylinder head 10. An ACG starter motor M functioning as a cell motor at a start time of the engine E and functioning as a generator after the start of the engine E is provided at an end portion of a crankshaft S of the engine E.

A fuel tank 2 having a bottom shape straddling the main frame 4 in the vehicle width direction is disposed above the power unit P. An electric low-pressure fuel pump 33 that supplies the fuel to the high-pressure fuel pump 30 is disposed on the inside of the fuel tank 2. A rear frame 20 that supports a seat 22, etc. is fixed behind the main frame 4. A pair of left and right side covers 23 is disposed below the seat 22.

Figure 2:
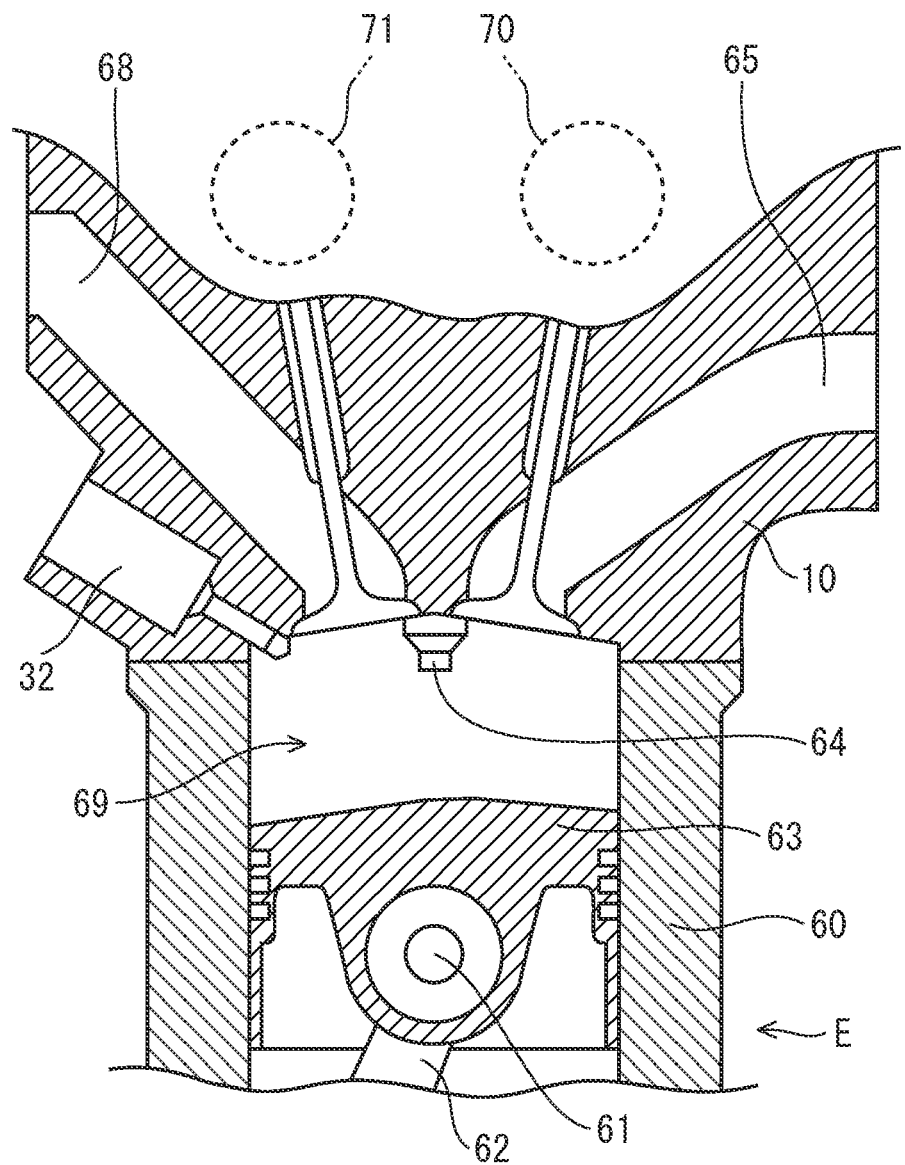
FIG. 2 is a partially enlarged cross-sectional view of an engine.

FIG. 2 is a partially enlarged cross-sectional view of the engine E. The cylinder head 10 of the engine E is fixed to an upper portion of the cylinder 60 that slidably holds a piston 63, and a combustion chamber 69 is formed between the cylinder 60 and the cylinder head 10. The piston 63 is pivotally supported so as to be swingable by a small end portion 61 of a connecting rod 62 coupled to the crankshaft S. The cylinder head 10 is provided with a valve mechanism including an exhaust valve 66 provided in an exhaust port 65, an intake valve 67 provided in an intake port 68, an exhaust-side camshaft 70 that causes the exhaust valve 66 to reciprocate, and an intake-side camshaft 71 that causes the intake valve 67 to reciprocate. An ignition plug 64 is disposed in a ceiling portion of the combustion chamber 69. The injector 32 is configured to directly inject the fuel into the inside of the combustion chamber 69 from a position near the intake valve 67.

Figure 3:
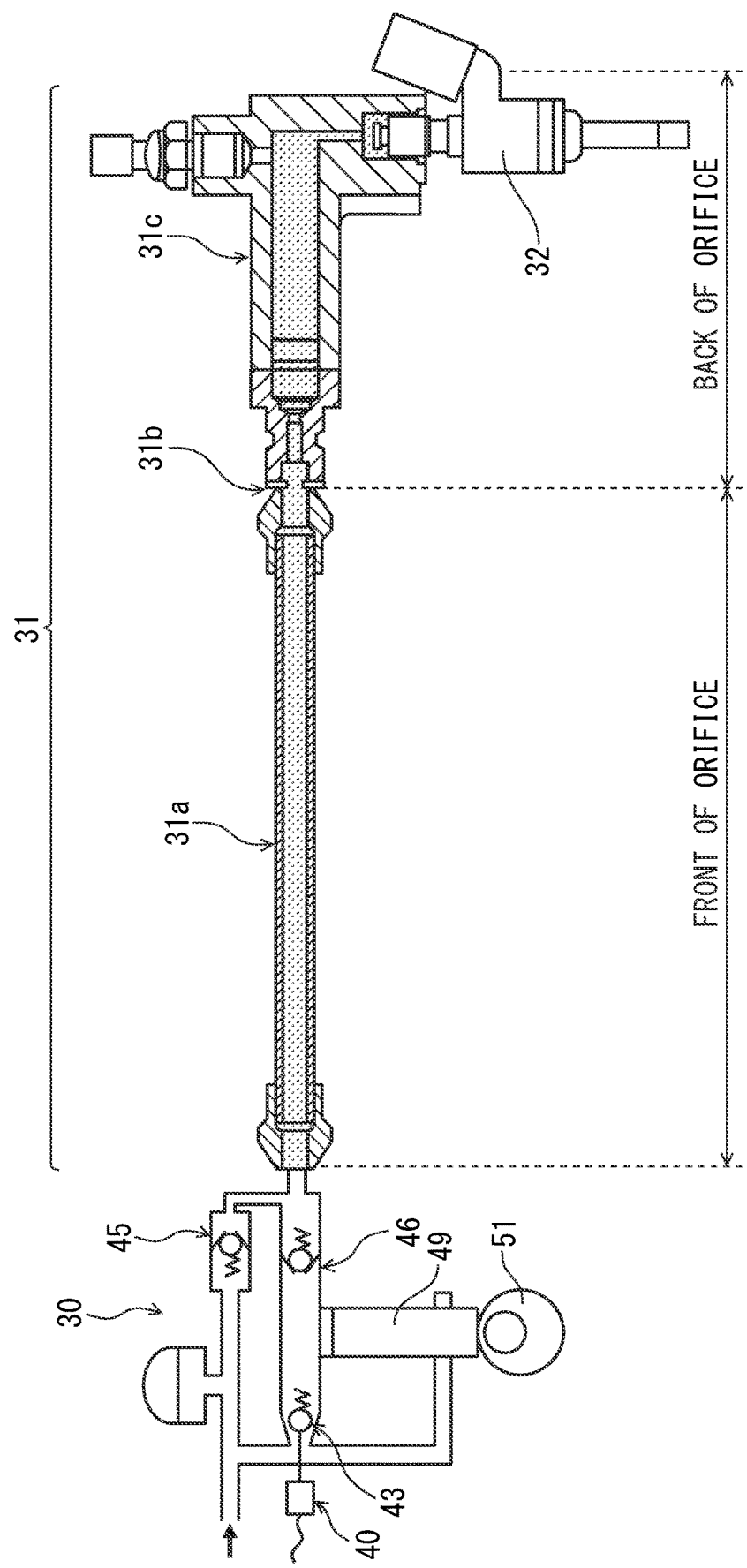
FIG. 3 is a cross-sectional view illustrating a configuration of the high-pressure fuel pipe.
Figure 4:
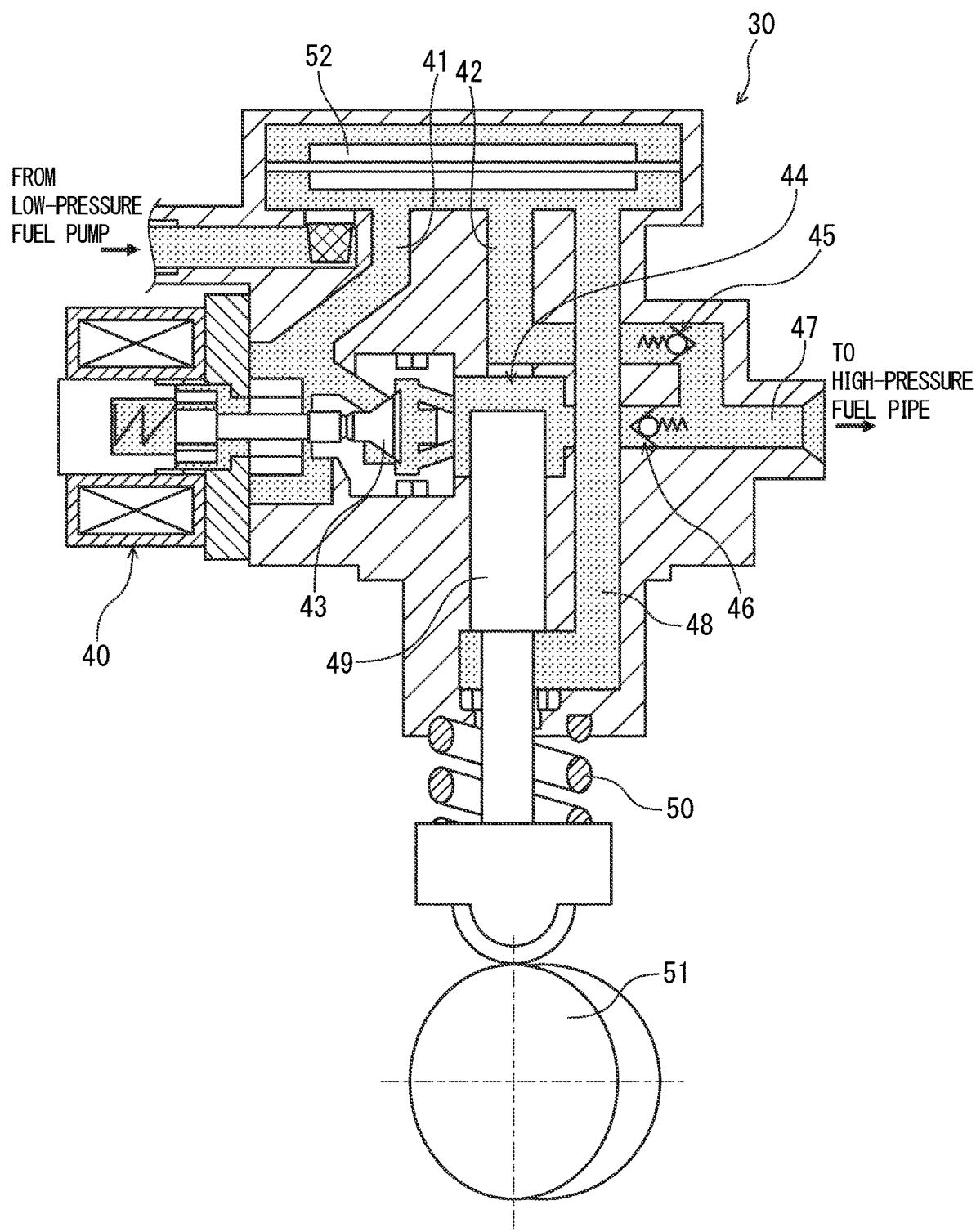
FIG. 4 is a cross-sectional view illustrating a configuration of a high-pressure fuel pump.

FIG. 3 is a cross-sectional view illustrating a configuration of the high-pressure fuel pipe 31. FIG. 4 is a cross-sectional view illustrating a configuration of the high-pressure fuel pump 30. The fuel in the fuel tank 2 is pressure-fed to the high-pressure fuel pump 30 by the electric low-pressure fuel pump 33. In the high-pressure fuel pump 30, a pump cam 51 that rotates synchronously with the intake-side camshaft 71 causes the plunger 49 to reciprocate to pressure-feed the fuel to the high-pressure fuel pipe 31 at higher pressure.

The high-pressure fuel pipe 31 includes a joint pipe 31*a* coupled to the high-pressure fuel pump 30, an injector holder 31*c* that holds the injector 32, and an orifice 31*b* provided between the joint pipe 31*a* and the injector holder 31*c*. As explained above, by providing the orifice 31*b* in the high-pressure fuel pipe 31, pulsation that occurs in the high-pressure fuel pipe 31 can be attenuated. One injector 32 is provided for each cylinder. In the case of a parallel two-cylinder engine, the injector holder 31*c* is formed in a shape elongated in the vehicle width direction and holds two injectors 32.

Conventionally, it has been difficult to derive an appropriate volume of such a high-pressure fuel pipe 31 on a desk. However, the inventor of the present invention has made it possible to derive an appropriate volume of the high-pressure fuel pipe 31 with a predetermined arithmetic expression.

Referring to FIG. 4, the fuel pressure-fed from the low-pressure fuel pump 33 to the high-pressure fuel pump 30 is supplied to an oil supply passage 41 via a pulsation damper 52 that reduces fuel-pressure pulsation. The oil supply passage 41 is provided with a valve 43 that is opened and closed by an electromagnetic solenoid 40, thereby the oil supply passage 41 is configured such that the fuel can flow into a plunger chamber 44 only while the motorcycle 1 is powered on.

The plunger 49 is urged downward by a return spring 50 and moves up and down according to the rotation of the pump cam 51 to pressure-feed the fuel. The pump cam 51 that rotates synchronously with the intake-side camshaft 71 rotates once while the crankshaft S rotates twice. One cam ridge of the pump cam 51 is provided when the engine E is a single-cylinder and two cam ridges of the pump cam 51 are provided when the engine E is a two-cylinder.

The fuel pressure-fed from the plunger chamber 44 passes through a check valve 46 and is discharged from a discharge path 47 to the high-pressure fuel pipe 31. The check valve 46 prevents the fuel from returning to the plunger chamber 44 side. On the other hand, when a fuel pressure is higher than a predetermined value of the discharge path 47, the relief valve 45 is opened, whereby the fuel is returned from the return path 42 to the upstream side. With such a configuration, when the high-pressure fuel pump 30 and the high-pressure fuel pipe 31 are once filled with the fuel, a predetermined feed fuel pressure P0 is maintained within a range of an opening pressure of the relief valve 45 even if the engine E is stopped.

Figure 5:
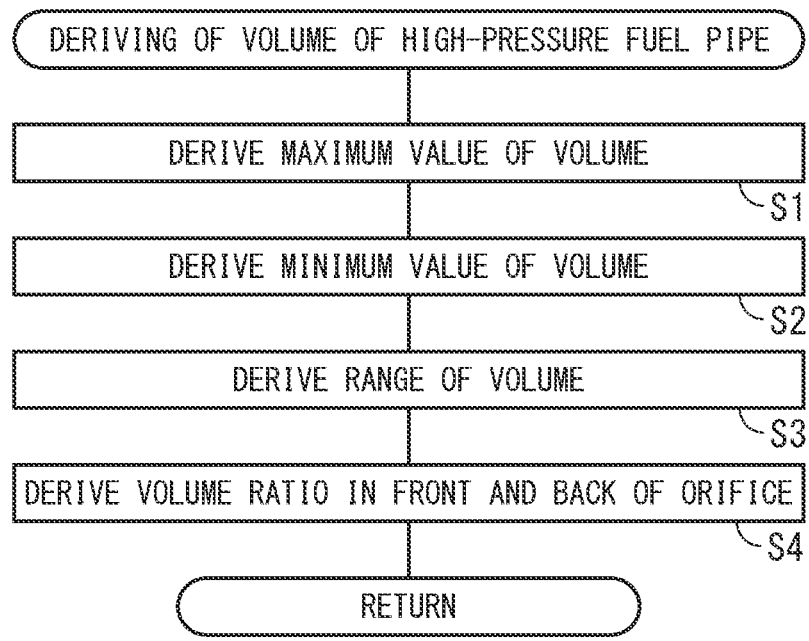
FIG. 5 is a flowchart illustrating a procedure for deriving an appropriate volume of the high-pressure fuel pipe.

FIG. 5 is a flowchart illustrating a procedure for deriving an appropriate volume of the high-pressure fuel pipe 31. In step S1, a maximum value VtMax of a volume Vt is derived using a predetermined arithmetic expression. In step S2, a minimum value VtMin of the volume Vt is derived using a predetermined arithmetic expression. In subsequent step S3, an appropriate range of the volume Vt is derived using a predetermined arithmetic expression. Then, in step S4, a ratio of the volumes Vt in the front and the back of an orifice is derived. According to these four steps, an appropriate volume Vt of the high-pressure fuel pipe can be derived. Hereinafter, these four procedures are explained in order together with the arithmetic expressions to be used.

FIG. 6 is an arithmetic expression for calculating the maximum value VtMax of the volume Vt of the high-pressure fuel pipe 31. The inventor of the present invention has derived that the maximum value VtMax of the volume Vt of the high-pressure fuel pipe 31 can be calculated by k×Q/ΔP/1000×n, where k is a volume modulus of fuel, Q is a maximum discharge amount of the fuel in one reciprocation of the high-pressure fuel pump (30), ΔP is a difference between a target fuel pressure P1 and a feed fuel pressure P0, and n is the number of times of boosting in one rotation of the high-pressure fuel pump 30.

In the cylinder injection type engine E, in order to secure startability equivalent to that of a normal engine that inject fuel to an intake port, it is necessary to boost the pressure of the high-pressure fuel pipe 31 from the feed fuel pressure P0 to the target fuel pressure P1 while the crankshaft rotates twice, that is, while the high-pressure fuel pump 30 rotates once.

At this time, if the volume of the high-pressure fuel pipe 31 is too large, a total fuel amount is too large with respect to an amount of the fuel fed while the high-pressure fuel pump 30 rotates once. Therefore, the pressure boosted while the high-pressure fuel pump 30 rotates once does not reach the target fuel pressure P1.

The arithmetic expression described above calculates the maximum value VtMax of the volume that satisfies this condition.

As an example, in a predetermined single-cylinder engine, the maximum value VtMax of the volume is calculated using an arithmetic expression.
(1) The volume modulus k is 1300 MPa specific to gasoline
(2) The maximum discharge amount Q of the fuel in one reciprocation of the high-pressure fuel pump (30) is 26.12 mm$^3$/stroke derived from a design value of the high-pressure fuel pump 30
(3) The target fuel pressure P1 is 3.5 MPa
(4) The feed fuel pressure P0 is 0.343 MPa obtained by an experiment
(5) The number of times of boosting n is one The maximum value of the volume calculated according to the above conditions is 10.8 cm$^3$.

As another example, in a predetermined two-cylinder engine, the maximum value VtMax of the volume is calculated using an arithmetic expression.
(1) The volume modulus k is 1300 MPa specific to gasoline
(2) The pump maximum actual discharge amount Q is 120.00 mm$^3$/stroke derived from the design value of the high-pressure fuel pump 30
(3) The target fuel pressure P1 is 3.5 MPa
(4) The feed fuel pressure P0 is 0.392 MPa obtained by an experiment
(5) The number of times of boosting n is two The maximum value of the volume calculated according to the above conditions is 100.4 cm$^3$.

As explained above, the maximum value VtMax of the volume in a range in which the pressure boosted while the high-pressure fuel pump 30 rotates once, reaches the target fuel pressure P1 can be obtained by the arithmetic expression. Therefore, design man-hour can be reduced.

FIG. 7 is an arithmetic expression for calculating the minimum value VtMin of the volume of the high-pressure fuel pipe 31. The inventor of the present invention has derived that the minimum value VtMin of the volume of the high-pressure fuel pipe 31 can be calculated by q/0.6, where q is an amount of the fuel pressure-fed by the high-pressure fuel pump 30 in one second.

In the cylinder injection engine, fuel pressure pulsation in the high-pressure fuel pipe caused by driving of the high-pressure fuel pump 30 causes deterioration in accuracy of an air-fuel ratio (A/F). In order to keep this accuracy deterioration equal to or smaller than an allowable value, the present embodiment aims to set the fuel-pressure pulsation to 1.2 MPa or less. A number "0.6" in the arithmetic expression is set based on a plurality of experiments as a value at which the fuel pressure pulsation is 1.2 MPa or less.

The fuel pressure pulsation is larger as the volume of the high-pressure fuel pipe 31 is smaller. The arithmetic expression described above calculates the minimum value VtMin of the volume at which the fuel pressure pulsation can be set to 1.2 MPa or less.

As an example, in a predetermined two-cylinder engine (assumed maximum engine speed is 8300 rpm, the maximum discharge amount Q of the fuel in one reciprocation of the high-pressure fuel pump (30) per cylinder is 120.00 mm$^3$/stroke, and the number of cam ridges of a pump cam is two), a minimum value of a volume is calculated using an arithmetic expression.

(1) The amount q of the fuel pressure-fed by the high-pressure fuel pump 30 in one second is 16600 mm$^3$/sec from a design value.

The minimum value of the volume calculated according to the above conditions is 27.7 cm$^3$.

As explained above, the minimum value of the volume in a range in which the accuracy of the air-fuel ratio does not exceed the allowable value can be calculated by the arithmetic expression. Therefore, design man-hour can be reduced.

FIG. 8 is a second arithmetic expression for calculating the minimum value VtMin of the volume of the high-pressure fuel pipe 31. The inventor of the present invention has derived that the minimum value VtMin of the volume of the high-pressure fuel pipe 31 can be calculated by q/0.4, where q is an amount of the fuel pressure-fed by the high-pressure fuel pump 30 in one second.

In the cylinder injection engine, if the volume of the high-pressure fuel pipe 31 is too small, the fuel pressure is too high at the time of boosting by the high-pressure fuel pump 30 and the relief valve 45 of the high-pressure fuel pump 30 opens. Therefore, in order to keep the fuel pressure within a range in which the relief valve 45 of the high-pressure fuel pump 30 does not open, an object is to set the fuel pressure at the boosting time to 25.3 MPa or less in the present embodiment. A number "0.4" in the arithmetic expression is set based on a plurality of experiments as a value at which the fuel pressure at the boosting time is 25.3 MPa or less.

As the volume of the high-pressure fuel pipe 31 is smaller, the fuel pressure at the boosting time is larger. The arithmetic expression described above calculates the minimum value of the volume at which the fuel pressure at the boosting time can be set to 25.3 MPa or less.

As an example, in a predetermined two-cylinder engine (assumed maximum engine speed is 8300 rpm, the maximum discharge amount Q of the fuel in one reciprocation of the high-pressure fuel pump (30) per cylinder is 120.00 mm$^3$/stroke, and the number of cam ridges of a pump cam is two), a minimum value of a volume is calculated using an arithmetic expression.

(1) The amount q of the fuel pressure-fed by the high-pressure fuel pump 30 in one second is 16600 mm$^3$/sec from a design value.

The minimum value of the volume calculated according to the above conditions is 41.5 cm$^3$ (41500 mm$^3$).

As explained above, the minimum value of the volume in the range in which the relief valve 45 of the high-pressure fuel pump 30 does not open at the boosting time can be calculated by the arithmetic expression. Therefore, design man-hour can be reduced.

FIG. 9 is an arithmetic expression for calculating an appropriate volume range of the high-pressure fuel pipe 31. This arithmetic expression (q/0.4≤Vt≤k×Q/ΔP/1000×n) is a combination of the arithmetic expression for calculating the maximum value VtMax illustrated in FIG. 5 and the arithmetic expression for calculating the minimum value VtMin illustrated in FIG. 7. Concerning the minimum value VtMin, since the arithmetic expression of FIG. 7 focusing on the relief valve has a larger value than the arithmetic expression of FIG. 6 focusing on the fuel pressure pulsation, the arithmetic expression of FIG. 7 is applied. The range of the volume Vt of the high-pressure fuel pipe 31 in the predetermined two-cylinder engine calculated from this arithmetic expression is 41.5~100.4 cm$^3$.

FIG. 10 is an arithmetic expression for calculating a minimum value Vt1Min of the pre-orifice volume Vt1 of the high-pressure fuel pipe 31. The inventor of the present invention has derived that, when the volume Vt of the high-pressure fuel pipe 31 includes the pre-orifice volume Vt1 on the upstream side and the post-orifice volume Vt2 on the downstream side across the orifice 31b, the minimum value of the pre-orifice volume Vt1 can be calculated by q/3.0.

In the cylinder injection engine, if the pre-orifice volume Vt1 is too small, the fuel pressure is too high at the time of boosting by the high-pressure fuel pump 30 and the relief valve 45 of the high-pressure fuel pump 30 opens. Therefore, in order to keep the fuel pressure within the range in which the relief valve 45 of the high-pressure fuel pump 30 does not open, an object is to set the fuel pressure at the boosting time to 25.3 MPa or less in the present embodiment. A number "3.0" in the arithmetic expression is set based on a plurality of experiments as a value at which the fuel pressure at the boosting time is 25.3 MPa or less.

The fuel pressure at the boosting time is larger as the volume of the pre-orifice volume Vt1 is smaller. The arithmetic expression described above calculates the minimum value of the volume at which the fuel pressure at the boosting time can be set to 25.3 MPa or less.

As an example, in a predetermined two-cylinder engine (assumed maximum engine speed is 8300 rpm, the maximum discharge amount Q of the fuel in one reciprocation of the high-pressure fuel pump (30) per cylinder is 120.00 mm³/stroke, and the number of cam ridges of a pump cam is two), a minimum value of a volume is calculated using an arithmetic expression.

(1) The amount q of the fuel pressure-fed by the high-pressure fuel pump 30 in one second is 16600 mm³/sec from a design value.

The minimum value of the volume calculated according to the above conditions is 5.5 cm³ (5533 mm³).

As explained above, the minimum value Vt1Min of the volume in the range in which the relief valve 45 of the high-pressure fuel pump 30 does not open at the boosting time can be calculated by the arithmetic expression. Therefore, design man-hour can be reduced.

Note that the form of the motorcycle, the form of the engine, the structure of the high-pressure fuel pump, the disposition and the shape of the high-pressure fuel pipe, the magnitudes of the numbers used in the arithmetic expressions, the design value of the fuel pump used in the experiments, the maximum actual discharge amount of the pump, etc. are not limited to the above embodiments and various changes are possible. The high-pressure fuel pipe according to the present invention can be applied to various vehicles mounted with a single-cylinder or two-cylinder engine.

REFERENCE SIGNS LIST

1 . . . Motorcycle
2 . . . Fuel tank
30 . . . High-pressure fuel pump
31 . . . High-pressure fuel pipe
31a . . . Joint pipe
31b . . . Orifice
31c . . . Injector holder
32 . . . Injector
33 . . . Low-pressure fuel pump
69 . . . Combustion chamber
71 . . . Camshaft (intake-side camshaft)
E . . . Engine
k . . . Volume modulus
Q . . . Maximum discharge amount of fuel in one reciprocation of high-pressure fuel pump
$\Delta P$ . . . Difference between target fuel pressure and feed fuel pressure
Vt . . . Volume of high-pressure fuel pipe
VtMax . . . Maximum value of volume
q . . . Amount of fuel pressure-fed by high-pressure fuel pump in one second
VtMin . . . Minimum value of volume
Vt1 . . . Pre-orifice volume on upstream side
Vt2 . . . Post-orifice volume on downstream side

The invention claimed is:

1. A high-pressure fuel pipe applied to a cylinder injection type engine that directly injects fuel into a combustion chamber with an injector, wherein
    the high-pressure fuel pipe is a pipe disposed between the injector and a high-pressure fuel pump,
    the high-pressure fuel pump is provided on a downstream side of a low-pressure fuel pump,
    the engine is a single cylinder or a two-cylinder,
    the high-pressure fuel pump is a plunger type that performs pressurization once or twice per rotation in synchronization with a camshaft of the engine, and
    a value of a volume of the high-pressure fuel pipe is $k \times Q/\Delta P/1000 \times n$ or less, where k is a volume modulus of fuel, Q is a maximum discharge amount of the fuel in one reciprocation of the high-pressure fuel pump, $\Delta P$ is a difference between a target fuel pressure boosted by the high-pressure fuel pump and a feed fuel pressure boosted by the low-pressure fuel pump, and n is a number of times of boosting in one rotation of the high-pressure fuel pump.

2. The high-pressure fuel pipe according to claim 1, wherein the value of the volume of the high-pressure fuel pipe is q/0.6 or more, where q is an amount of the fuel pressure-fed by the high-pressure fuel pump in one second.

3. The high-pressure fuel pipe according to claim 1, wherein the value of the volume of the high-pressure fuel pipe is q/0.4 or more, where q is an amount of the fuel pressure-fed by the high-pressure fuel pump in one second.

4. The high-pressure fuel pipe according to claim 3, wherein the volume of the high-pressure fuel pipe is calculated by a following arithmetic expression $q/0.4 \leq Vt \leq k \times Q/\Delta P/1000 \times n$, where Vt is the volume of the high-pressure fuel pipe.

5. The high-pressure fuel pipe according to claim 4, wherein
    the volume of the high-pressure fuel pipe includes a pre-orifice volume on an upstream side and a post-orifice volume on a downstream side across an orifice, and
    a value of the pre-orifice volume is q/3.0 or more.

6. The high-pressure fuel pipe according to claim 4, wherein
    the engine is a single cylinder engine,
    k as the volume modulus of the fuel is 1300 MPa,
    Q as the maximum discharge amount of the fuel in one reciprocation of the high-pressure fuel pump is 26.12 mm³/stroke, and
    n as the number of times of boosting is one.

7. The high-pressure fuel pipe according to claim 4, wherein
    the engine is a two-cylinder engine,
    k as the volume modulus of the fuel is 1300 MPa, Q as the maximum discharge amount of the fuel in one reciprocation of the high-pressure fuel pump is 120.00 mm$^3$/stroke, and n as the number of times of boosting is two.

* * * * *